United States Patent
Hwang et al.

(10) Patent No.: US 10,389,970 B2
(45) Date of Patent: Aug. 20, 2019

(54) METHOD AND DEVICE FOR TRANSMITTING AND RECEIVING BROADCAST SIGNAL FOR RESTORING PULLED-DOWN SIGNAL

(71) Applicant: LG ELECTRONICS INC., Seoul (KR)

(72) Inventors: Soojin Hwang, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 15/544,929

(22) PCT Filed: Jan. 22, 2016

(86) PCT No.: PCT/KR2016/000709
§ 371 (c)(1),
(2) Date: Jul. 20, 2017

(87) PCT Pub. No.: WO2016/117964
PCT Pub. Date: Jul. 28, 2016

(65) Prior Publication Data
US 2018/0020185 A1    Jan. 18, 2018

Related U.S. Application Data

(60) Provisional application No. 62/106,732, filed on Jan. 23, 2015.

(51) Int. Cl.
*H04N 19/46* (2014.01)
*H04N 7/12* (2006.01)
*H04N 7/01* (2006.01)
*H04N 5/253* (2006.01)
*H04N 19/70* (2014.01)
*H04N 7/08* (2006.01)

(52) U.S. Cl.
CPC ......... *H04N 7/0115* (2013.01); *H04N 5/253* (2013.01); *H04N 7/0806* (2013.01); *H04N 19/46* (2014.11); *H04N 19/70* (2014.11); *H04N 7/012* (2013.01)

(58) Field of Classification Search
CPC ....... H04N 7/0115; H04N 19/70; H04N 5/253
See application file for complete search history.

(56) References Cited

U.S. PATENT DOCUMENTS

| | | | | |
|---|---|---|---|---|
| 6,091,776 | A * | 7/2000 | Linzer | G06T 9/004 348/96 |
| 6,297,848 | B1 * | 10/2001 | Westerman | H04N 7/0112 348/441 |
| 9,294,804 | B2 * | 3/2016 | Costa | H04N 21/2343 |

(Continued)

*Primary Examiner* — Tsion B Owens
(74) *Attorney, Agent, or Firm* — Birch, Stewart, Kolasch & Birch, LLP

(57) ABSTRACT

The present invention provides a method and a device for transmitting and receiving a broadcast signal for restoring a pulled-down signal. The method for transmitting the broadcast signal, according to one embodiment of the present invention, comprises the steps of: pulling video data down so as to reconfigure the same; encoding the reconfigured video data; encoding signaling information for the reconfigured video data; generating the broadcast signal including the encoded video data and the encoded signaling information; and transmitting the generated broadcast signal.

11 Claims, 7 Drawing Sheets

(56) References Cited

U.S. PATENT DOCUMENTS

| | | | |
|---|---|---|---|
| 9,565,452 B2* | 2/2017 | Wang | H04N 19/70 |
| 9,654,812 B2* | 5/2017 | Veltman | H04N 21/23406 |
| 9,876,797 B2* | 1/2018 | Jogand-Coulomb | G06F 21/10 |
| 2007/0097259 A1* | 5/2007 | MacInnis | H04N 19/61 |
| | | | 348/441 |
| 2007/0296870 A1* | 12/2007 | Foret | H04N 5/937 |
| | | | 348/701 |
| 2008/0019438 A1* | 1/2008 | Takahashi | H04N 19/70 |
| | | | 375/240 |
| 2008/0062308 A1* | 3/2008 | Zhai | H04N 7/0115 |
| | | | 348/448 |
| 2009/0322939 A1* | 12/2009 | Okuda | H04N 7/012 |
| | | | 348/441 |
| 2012/0020413 A1 | 1/2012 | Chen et al. | |
| 2012/0162508 A1 | 6/2012 | Okuda | |
| 2012/0163447 A1* | 6/2012 | Mehrotra | H04N 5/144 |
| | | | 375/240.02 |
| 2014/0079116 A1* | 3/2014 | Wang | H04N 19/597 |
| | | | 375/240.02 |
| 2014/0092992 A1 | 4/2014 | Sullivan et al. | |
| 2015/0264404 A1* | 9/2015 | Hannuksela | H04N 19/70 |
| | | | 375/240.16 |

* cited by examiner

FIG. 3

| pull_down_info( payloadSize ) { | Descriptor |
|---|---|
| pull_down_type | u(3) |
| size_of_cadence | u(5) |
| start_of_cadence_flag | u(1) |
| pairing_mismatch_flag | u(1) |
| duplicate_flag | u(1) |
| reserved | u(5) |
| } | |

METHOD AND DEVICE FOR TRANSMITTING AND RECEIVING BROADCAST SIGNAL FOR RESTORING PULLED-DOWN SIGNAL

CROSS REFERENCE TO RELATED APPLICATIONS

This application is the National Phase of PCT International Application No. PCT/KR2016/000709, filed on Jan. 22, 2016, which claims priority under 35 U.S.C. 119(e) to U.S. Provisional Application No. 62/106,732, filed on Jan. 23, 2015, all of which are hereby expressly incorporated by reference into the present application.

TECHNICAL FIELD

The present invention relates to a method and device for transmitting and receiving a broadcast signal.

BACKGROUND ART

A moving video called a moving photo may be categorized into two types of TV video and theater screening video in shooting and production. First of all, in case of the theater screening video taken using a film, typical still photos are taken continuously and then displayed in accordance with a time sequence. In this case, it is easily noted that each cut of the video becomes a still video. However, since the video broadcasted through TV includes two fields not a whole photo of one cut, these fields should be combined with each other to allow a user to see a whole photo. In this case, various reasons may exist. Since TV transmission technique and performance of the cathode ray tube are not good in the early stage, a very short time for emitting light by stimulating a fluorescent material through a cathode ray is big reason. In case of NTSC scheme, since 30 sheets of frames (29.97 fps) are required for 1 second, the video should remain on the cathode ray tube for at least ⅒ seconds or more until next frame is displayed after one frame is displayed. However, since the cathode ray tube of the early stage does not support this technique, an expedient method for splitting one frame into two fields and interlacing them is used. In this way, the video could be transmitted by a cathode ray tube and transmission scheme of low performance. However, a drawback occurs in that movement of fast scene or complex video cannot be displayed in detail. This interlace scan scheme has been applied to most of TVs up to now, and most of all videos have been shot, edited and broadcasted in accordance with the interlace scan scheme. Meanwhile, the theater screening video shot by a film is displayed by 24 sheets of images (24 fps) per second progressive in due order, wherein the 24 frames indicate a sheet of photo which is not split. Therefore, the theater screening video has advantages in that a clearer image may be displayed and details are not lost even in case of fast movement.

There are a progressive scan scheme and an interlace scan scheme. A main example of the progressive scan scheme may include computer monitor or digital TV such as PDP or LCD. This progressive scan scheme displays all horizontal lines of video in one frame at one time. On the other hand, TV currently used by most of people displays only half of a horizontal line in one image frame when displaying one image regardless of NTSC scheme or PAL scheme. This scheme will be referred to as the interlace scan scheme. That is, the interlace scan scheme displays an image on a screen by splitting one frame into two fields (top/bottom, upper/lower/odd/even, etc.) and alternately displaying the fields in due order.

One of those most closely related to a 3:2 pulldown progressive scan scheme is a movie produced by a film. This is because that an original source of most of all DVD movie titles recently released is a movie produced by a film. Unlike NTSC TV, a movie is produced by 24 frames per second. DVD may be produced directly by original image of 24 frames in the same manner as original movie. However, since most of display equipments such as TV currently used are interlace type equipments, DVD should practically be produced by the interlace scan scheme in accordance with such an interface. At this time, a task for switching a film of 24 frames to a video of 60 fields will be referred to as 3:3 pulldown or telecine. This may be summarized in such a manner that five video frames are produced by four films by adding one field per two film frames. 3:2 pulldown means that three fields are made by a first frame and two fields are made by a second frame.

Recently, in accordance with the development of display technology, a progressive type display device has appeared, whereby studies of a method for restoring 3:2 pulled-down video will be required.

DISCLOSURE

Technical Problem

An object of the present invention devised to solve the aforementioned problem is to provide a method for restoring a pulled-down signal.

Another object of the present invention is to provide a signaling method for restoring a pulled-down signal.

Technical Solution

A method for transmitting a broadcast signal according to one embodiment of the present invention may comprise the steps of: pulling video data down so as to reconfigure the same; encoding the reconfigured video data; encoding signaling information for the reconfigured video data; generating the broadcast signal including the encoded video data and the encoded signaling information; and transmitting the generated broadcast signal.

Preferably, the signaling information may include at least one of picture timing information for signaling the reconfigured video data and pull down information for signaling information on pull-down applied to the reconfigured video data.

Preferably, the picture timing information may include at least one of source scan type information indicating a scan type of a picture, picture configuration information indicating configuration information of the picture, and duplicate flag information indicating duplication or not of the picture.

Preferably, the pull down information may include at least one of pull down type information indicating a pull-down type applied to the reconfigured video data, cadence size information indicating a size of a cadence indicating a set of pictures to which the same type of pull-down is applied, cadence start information indicating a first picture of the cadence, paring mismatch information indicating whether pairing of a picture is matched with pairing before the video data is reconfigured, and duplicate flag information indicating duplication or not of the picture.

Preferably, the picture timing information and the pull down information may be transmitted by being included in a supplemental enhancement information (SEI) message.

In another aspect of the present invention, a method for receiving a broadcast signal comprises the steps of receiving a broadcast signal including video data reconfigured by pull-down and signaling information for the reconfigured video data; extracting the reconfigured video data and the signaling information from the received broadcast signal; and decoding the extracted reconfigured video data by using the extracted signaling information.

Preferably, the signaling information may include at least one of picture timing information for signaling the reconfigured video data and pull down information for signaling information on pull-down applied to the reconfigured video data.

Preferably, the picture timing information may include at least one of source scan type information indicating a scan type of a picture, picture configuration information indicating configuration information of the picture, and duplicate flag information indicating duplication or not of the picture.

Preferably, the pull down information may include at least one of pull down type information indicating a pull-down type applied to the reconfigured video data, cadence size information indicating a size of a cadence indicating a set of pictures to which the same type of pull-down is applied, cadence start information indicating a first picture of the cadence, paring mismatch information indicating whether pairing of a picture is matched with pairing before the video data is reconfigured, and duplicate flag information indicating duplication or not of the picture.

Preferably, the picture timing information and the pull down information may be transmitted by being included in a supplemental enhancement information (SEI) message.

Preferably, the method for receiving a broadcast signal may further comprise the step of restoring the decoded reconfigured video data to video data prior to pulling-down by using the signaling information.

Preferably, the restoring step may include deleting a duplicated picture from the reconfigured video data by using at least one of the duplicate flag information included in the picture timing information and the duplicate flag information included in the pull down information; controlling pairing of the pictures included in the video data from which the duplicated picture is deleted, by using the picture configuration information and the pairing mismatch information and realigning the order of the pictures; and restoring the paired pictures included in the realigned video data to one frame.

Preferably, at least one of the step of deleting the duplicated picture and the step of realigning the order of the pictures may be performed prior to the decoding step.

In still another aspect of the present invention, a device for transmitting a broadcast signal comprises a pull-down module for pulling down and reconfiguring video data; a video encoder for encoding the reconfigured video data; a signaling encoder for encoding signaling information for the reconfigured video data; a broadcast signal generator for generating a broadcast signal including the encoded video data and the encoded signaling information; and a transmission module for transmitting the generated broadcast signal.

In further still another aspect of the present invention, a device for receiving a broadcast signal comprises a reception module for receiving a broadcast signal including video data reconfigured by pull-down and signaling information for the reconfigured video data; an extraction module for extracting the reconfigured video data and the signaling information from the received broadcast signal; and a decoder for decoding the extracted reconfigured video data by using the extracted signaling information.

Advantageous Effects

According to the present invention, a method for restoring a pulled-down signal may be provided.

Another object of the present invention, a signaling method for restoring a pulled-down signal may be provided.

BRIEF DESCRIPTION OF THE DRAWINGS

FIG. 3 is a diagram illustrating a configuration of pull_down_info according to one embodiment of the present invention.

BEST MODE FOR CARRYING OUT THE INVENTION

Hereinafter, although the embodiments of the present invention will be described in detail with reference to the accompanying drawings and the disclosure described by the drawings, it is to be understood that the present invention is not limited by such embodiments.

Although the terms used in this specification are selected from generally known and used terms considering their functions in the present invention, the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
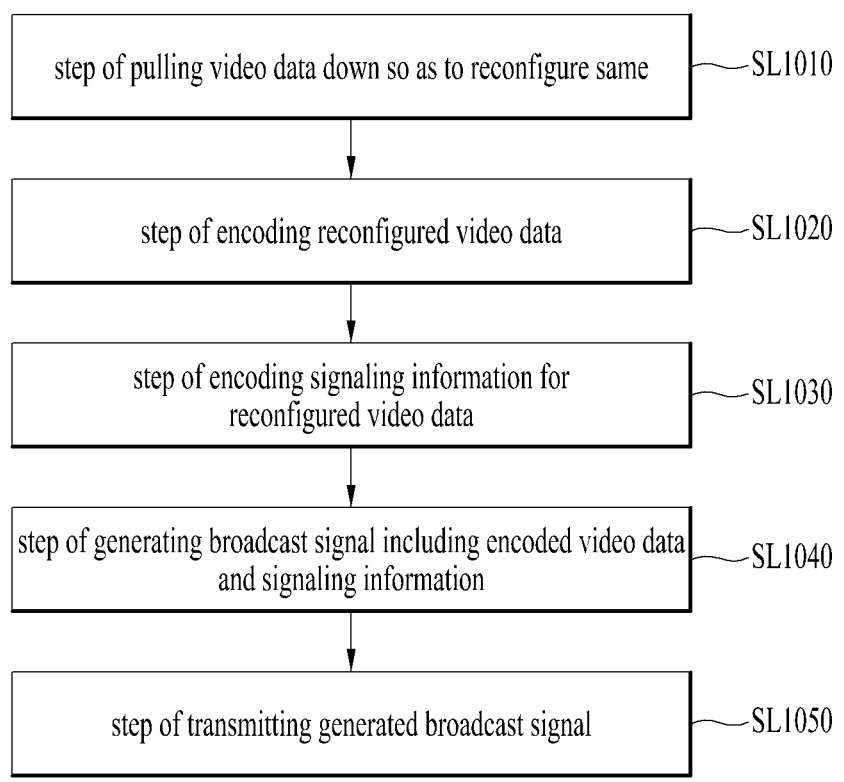
FIG. 1 is a diagram illustrating a method for transmitting a broadcast signal according to one embodiment of the present invention.

FIG. 1 is a diagram illustrating a method for transmitting a broadcast signal according to one embodiment of the present invention.

The method for transmitting a broadcast signal according to one embodiment of the present invention may comprise the step SL1010 of reconfiguring video data by pulling-down, the step SL1020 of encoding the reconfigured video data, the step SL1030 of encoding signaling information for the reconfigured video data, the step SL1040 of generating a broadcast signal including the encoded video data and the encoded signaling information, and/or the step SL1050 of transmitting the generated broadcast signal.

According to another embodiment of the present invention, the signaling information may include at least one of picture timing information for signaling a configuration of the reconfigured video data, and pull down information for signaling information on pull-down applied to the reconfigured video data. In this case, the picture timing information may indicate information included in a picture timing SET message. The pull down information may indicate information included in a pull down info SET message. Details of the pull down information will be described later with reference to FIGS. 3 and 4.

According to another embodiment of the present invention, the picture timing information may include at least one of source scan type information indicating a scan type of a picture, picture configuration information indicating configuration information of the picture, and duplicate flag information indicating duplication or not of the picture. In this case, the source scan type information may indicate information indicated by a source_scan_type element, the picture configuration information may indicate information indicated by a pic_struct element, and the duplicate flag information may indicate information indicated by a duplicate_flag element. Details of the above information will be described with reference to FIGS. 4 and 5.

According to another embodiment of the present invention, the pull down information may include at least one of pull down type information indicating a pull-down type applied to the reconfigured video data, cadence size information indicating a size of a cadence indicating a set of pictures to which the same type of pull-down is applied, cadence start information indicating a first picture of the cadence, paring mismatch information indicating whether pairing of a picture is matched with pairing before the video data is reconfigured, and duplicate flag information indicating duplication or not of the picture. In this case, the pull down type information may indicate information indicated by a pull_down_type element, the cadence size information may indicate information indicated by a size_of_cadence element, the cadence start information may indicate information indicated by a start_of_cadence_flag element, and the pairing mismatch information may indicate information indicated by a pairing_mismatch_flag element. Details of the above information will be described with reference to FIG. 3.

According to another embodiment of the present invention, the picture timing information and the pull down information may be transmitted by being included in a supplemental enhancement information (SEI) message. Details of these kinds of information will be described with reference to FIGS. 3 and 4.

Figure 2:
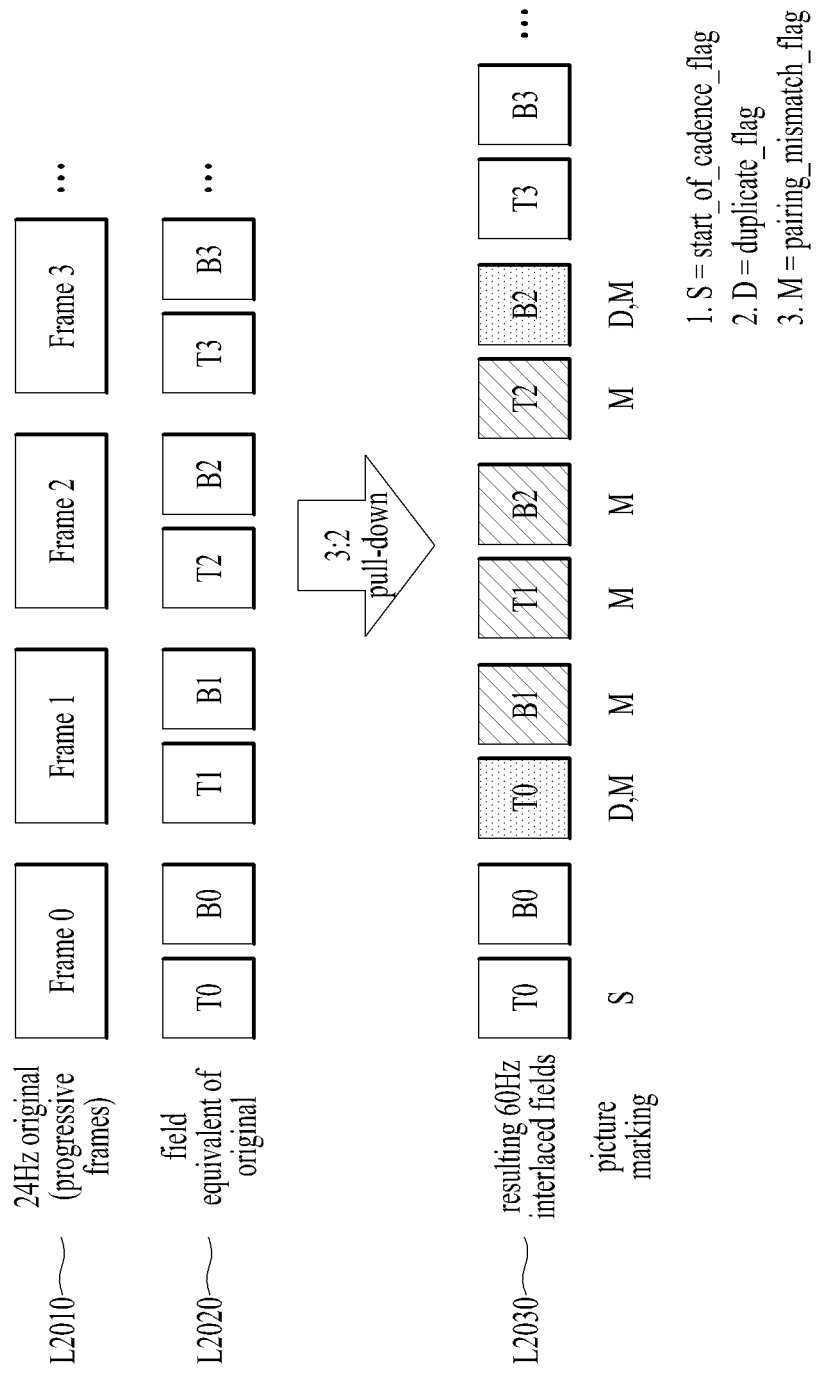
FIG. 2 is a diagram illustrating a procedure of generating 60i video by 3:2 pull-down of 24p video in accordance with one embodiment of the present invention.

FIG. 2 is a diagram illustrating a procedure of generating 60i video by 3:2 pull-down of 24p video in accordance with one embodiment of the present invention.

A transmitter according to one embodiment of the present invention may convert a progressive type video having 24 frame per second (24p) of 24 Hz into an interlace type video having 60 field per second (60i) of 60 Hz. According to one embodiment of the present invention, this procedure may be referred to as a 3:2 pull-down procedure.

L2010 of this drawing indicates a progressive type original video having 24 frames per second (24p) of 24 Hz. The transmitter according to one embodiment of the present invention may generate two fields by splitting one frame into an odd line and an even line. According to one embodiment of the present invention, the split odd line may be referred to as a top field (T), and the split even line may be referred to as a bottom field (B). In this drawing, Frame 0 indicates the 0th frame, Frame 1 the first frame, Frame 2 the second frame, and Frame 3 the third frame.

L2020 of this drawing indicates a video obtained by splitting each frame constituting a progressive type original video having 24 frames per second (24p) of 24 Hz into a top field and a bottom field. The transmitter according to one embodiment of the present invention may reconfigure the fields by duplicating at least one split field and interlacing the order of the split fields. In this drawing, T0 and B0 indicate the top field and the bottom field split from the 0th frame, T1 and B1 indicate the top field and the bottom field split from the first frame, T2 and B2 indicate the top field and the bottom field split from the second frame, and T3 and B3 indicate the top field and the bottom field split from the third frame.

L2030 of this drawing indicates an interlace type video having 60 fields per second (60i) of 60 Hz reconfigured by 3:2 pull-down procedure. According to one embodiment of the present invention, 10 fields reconfigured by the pull-down procedure may configure one set. In this case, the set may be referred to as a cadence. In this drawing, the field T0 indicates a first field constituting this set. In this drawing, the fields T0 and B2 have been duplicated (duplicate, D), and the fields T0, B1, T1, B2, T2 and B2 have been reconfigured in their order (mismatch, M). The transmitter according to one embodiment of the present invention may signal whether each of the reconfigured fields is the first field of the reconfigured set (start_of_cadence_flag), has been duplicated (duplicate_flag), and interlaced in their order (pairing_mismatch_flag). Details of the signaling will be described.

Referring to this drawing, the transmitter according to one embodiment of the present invention may generate 10 fields by 3:2 pulling-down of 8 consecutive fields when a value of a pic_struct element is from 9 to 12. In this case, the generated 10 fields may be broadcasted in a 60 interlaced field mode. "S" may be displayed in the first field of the generated 10 fields. "D" may be displayed in the third and eighth fields of the generated 10 fields. "M" may be displayed in the other fields except the first, second, ninth and tenth fields of the generated 10 fields. According to one embodiment of the present invention, a picture marked with "S" indicates a picture that includes a start_of_cadence_flag element, and a picture marked with "D" indicates a picture that includes a duplicate_flag element, and a picture marked with "M" indicates a picture that includes a pairing_mismatch_flag element. In this case, the expression that the corresponding picture includes the corresponding element means that the corresponding element has a value of 1. Alphabet displayed in each field has been described as above.

FIG. 3 is a diagram illustrating a configuration of pull_down_info according to one embodiment of the present invention.

According to one embodiment of the present invention, a prefix SEI (Supplemenntal Enhancemnet Information) NAL (Network Abstraction Information) unit or a suffix SEI NAL unit may include a user_data_registered_itu_t_t35( ) SEI message. The user_data_registered_itu_t_t35( ) SEI message may include a pull down info SEI message. According to one embodiment of the present invention, a pull down info SEI message may include pull_down_info.

According to one embodiment of the present invention, pull_down_info may be included in every picture.

The pull_down_info according to one embodiment of the present invention may include a pull_down_type element, a size_of_cadence element, a start_of_cadence_flag element, a pairing_mismatch_flag element, a duplicate_flag element and/or a reserved element.

The pull_down_type element indicates a type of a pull-down applied to encoded video stream. For example, this element indicates whether the pull-down corresponds to 3:2, 2:3 or another type. 3:2 pull-down is applied to one embodiment of the present invention of the previous drawing. In this case, the element indicates a 3:2 pull-down type.

The size_of_cadence element indicates the number of pictures included in a sequence of one pull-down pattern. According to one embodiment of the present invention, the sequence of one pull-down pattern may be referred to as one cadence or a set of fields. This element indicates the number of pictures from a picture marked with "S" to a previous picture of a picture marked with next "S" in view of an encoding order. In one embodiment of the present invention of the previous drawing, this element value indicates 10.

The start_of_cadence_flag element indicates whether a current picture is a start point of a pull-down pattern. An encoder according to one embodiment of the present invention may set a value of this element to 1 with respect to the first picture of one pull-down sequence.

The pairing_mismatch_flag element indicates whether a pair of a current top field and bottom field within an encoded stream is matched with a pair of a top field and bottom field within an original sequence. If this element has a value of 1, the current field indicates that the current field is matched with a field of another parity not a field matched with the current field in an original video source. That is, the value 1 of this element indicates that currently paired fields are those which do not belong to the same frame. In one embodiment of the present invention of the previous drawing, "M" is displayed in all pictures within one pull-down sequence except first two pictures and last two pictures, and the value of the pairing_mismatch_flag element for the pictures marked with "M" indicates 1.

The duplicate_flag element indicates whether the current picture is generated as a result of pull-down, and thus is repeated for the existing picture or duplicated version. The encoder according to one embodiment of the present invention may set the value of this element to 1 with respect to the repeated or duplicated picture. According to one embodiment of the present invention, the value of this element may be the same as the value of the duplicate_flag element within the picture timing SEI message.

The reserved element indicates an element for containing another information later.

Figure 4:
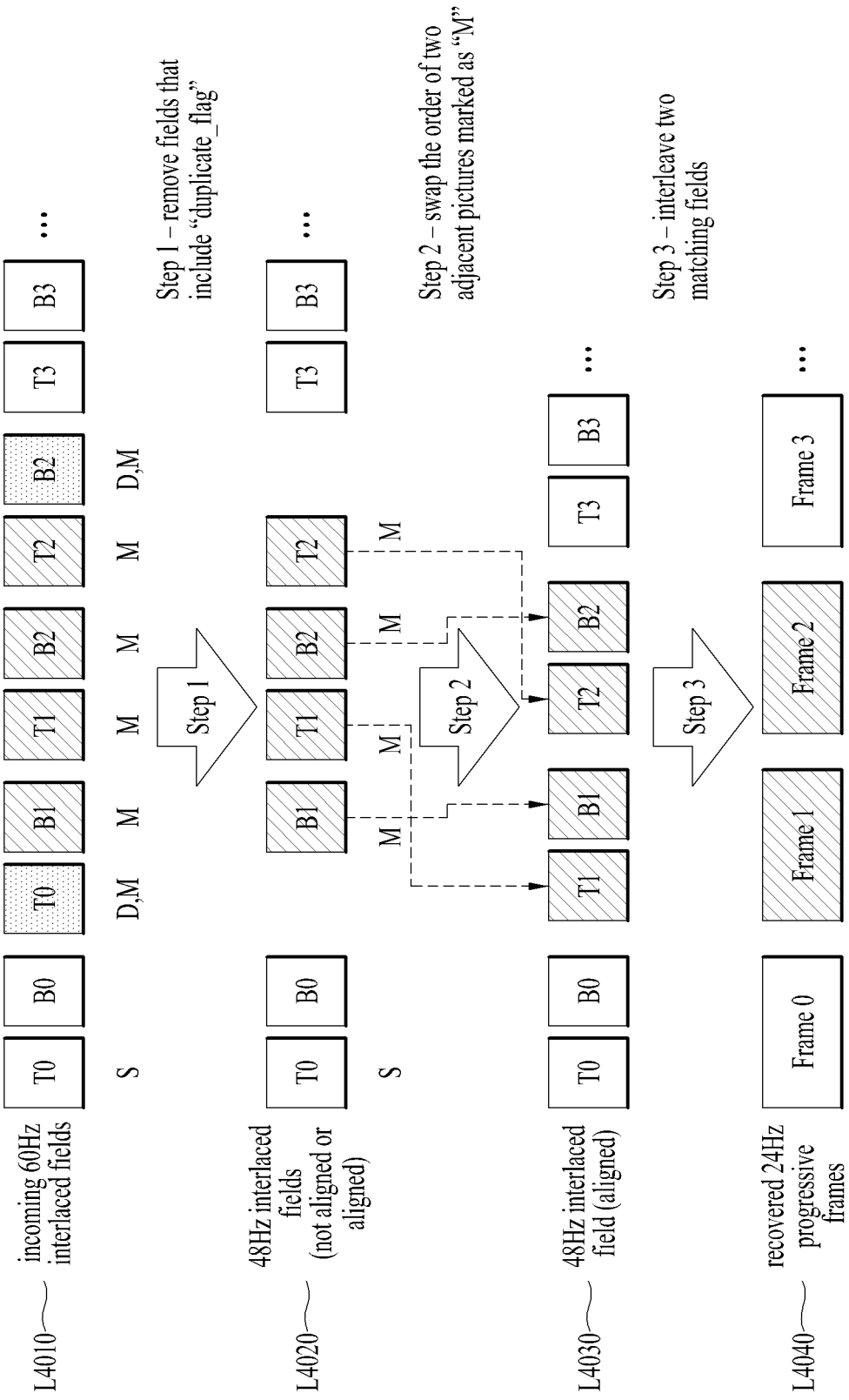
FIG. 4 is a diagram illustrating a procedure of restoring 24p video from 3:2 pulled-down 60i video in accordance with one embodiment of the present invention.

FIG. 4 is a diagram illustrating a procedure of restoring 24p video from 3:2 pulled-down 60i video in accordance with one embodiment of the present invention.

A receiver according to one embodiment of the present invention may receive a 3:2 pulled-down 60i video. L4010 of this drawing may correspond to a signal having fields per second of 60 Hz. In this case, a field marked with "S" indicates a field that includes a start_of_cadence_flag element, a field marked with "D" indicates a field that includes a duplicate_flag element, and a field marked with "M" indicates a field that includes a pairing_mismatch_flag element.

The receiver according to one embodiment of the present invention may remove the field that includes the duplicate_flag element from the received 3:2 pulled-down 60i video. (Step 1) L4010 of this drawing indicates a video from which the field that includes the duplicate_flag element is removed from the 3:2 pulled-down 60i video received by the receiver. This video may correspond to a signal having fields per second of 24 Hz, restored or not in the order prior to encoding. In this case, a field marked with "S" indicates a field that includes a start_of_cadence_flag element, and a field marked with "M" indicates a field that includes a pairing_mismatch_flag element.

The receiver according to one embodiment of the present invention may reverse the order of two adjacent fields that include the pairing_mismatch_flag element in the video from which the field that includes the duplicate_flag element is removed. (Step 2) L4030 of this drawing indicates a video in which the order of two adjacent fields that include the pairing_mismatch_flag element is reversed in the video from which the field that includes a duplicate_flag element is removed. This video may correspond to a signal having fields per second of 24 Hz, restored in the order prior to encoding.

The receiver according to one embodiment of the present invention may restore (a pair of) two fields constituting one frame to one frame by interleaving the two fields in the video in which the order of two adjacent fields that include the pairing_mismatch_flag element is reversed. (Step 3) L4040 of this drawing indicates a video in which (a pair of) two fields constituting one frame is restored into one frame. This video may correspond to a progressive type video having 24 frames per second (24p) of 24 Hz.

Figure 5:
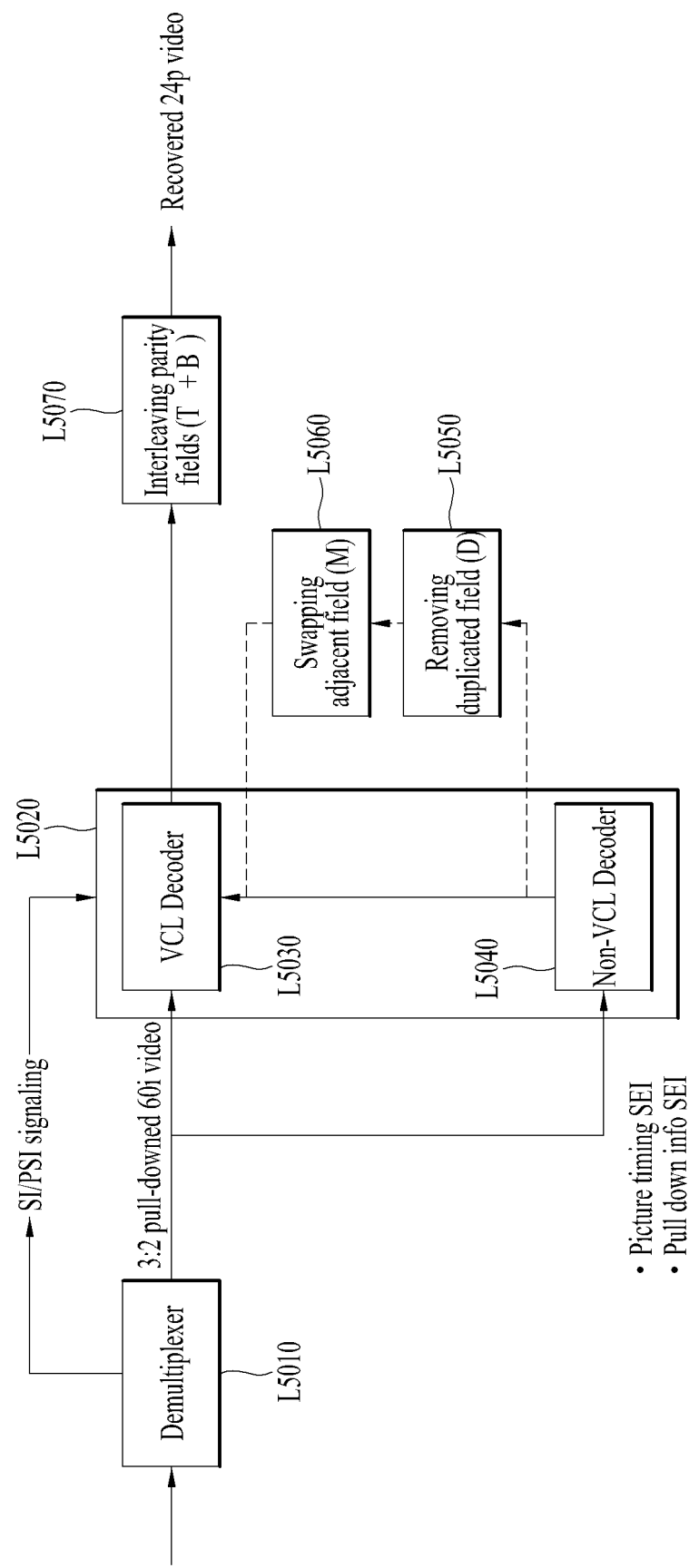
FIG. 5 is a diagram illustrating a configuration of a device for receiving a broadcast signal in accordance with one embodiment of the present invention.

FIG. 5 is a diagram illustrating a configuration of a device for receiving a broadcast signal in accordance with one embodiment of the present invention.

A video stream according to one embodiment of the present invention may include a picture timing SEI message and/or a pull down info SEI message. The picture timing SEI message may include a frame_field_info_present_flag element, a pic_struct element, a source_scan_type element and/or a duplicate_flag element. The pull down info SEI message may include the aforementioned elements.

A reception device according to one embodiment of the present invention may use information indicated by the source_scan type element and/or the duplicate_flag element when the frame_field_info_present_flag included in the picture timing SEI message has a value of 1. According to one embodiment of the present invention, the value of the pic_struct element ranging from 9 to 12 may be used to restore 24p video from the 3:2 pulled-down 60i video. Since the pic_struct element having a value of 1 and 2 does not transmit field related information, these values may not be used for a bit stream. Since the pic_struct element having values from 3 to 6 may not be used for the bit stream because all fields having the values from 3 to 6 of the pic_struct element are included in one AU (access unit).

The reception device according to one embodiment of the present invention may restore the pulled-down video by using the pull down info SEI message. The reception device may read information related to a picture (field (or picture) marked with "S" in the previous drawing) that includes the start_of_cadence_flag element, from the received pulled-down video. The reception device may identify a restoring process by using a pull_down_type element and/or a size_of_cadence element. The reception device may remove the field (field marked with "D" in the previous drawing) duplicated using the duplicate_flag element. The reception device may reverse the order of two adjacent pictures by using the pairing_mismatch_flag element and/or the pic_struct element included in the picture timing SEI message. In this case, since the pic_struct element may include order information of the fields, the pairing_mismatch_flag element should be signaled, whereby the reception device may restore the pulled-down video.

The reception device according to one embodiment of the present invention may include a demultiplexer L5010, a decoder L5020, a swapping adjacent field processor L5060, a removing duplicated field processor L5050 and/or an interleaving parity fields processor L5070. The decoder L5020 may include a VCL (Video Coding Layer) Decoder L5030 and/or a Non-VCL Decoder L5040.

According to one embodiment of the present invention, the removing duplicated field processor L5050 and/or the swapping adjacent field processor L5060 may be included in the reception device before the video stream is decoded by the VCL decoder, thereby deleting the corresponding field and reversing the order. Alternatively, the removing duplicated field processor L5050 and/or the swapping adjacent field processor L5060 may be included in the reception device after the video stream is decoded by the VCL decoder, thereby deleting the corresponding field and reversing the order.

The demultiplexer L5010 may receive a broadcast signal, parse SI/PSI signaling information from the received broadcast signal and output the parsed result to the decoder. Moreover, the demultiplexer may parse the 3:2 pulled-down 60i video from the broadcast signal and output the parsed result to the VCL decoder, and may parse the picture timing SEI message and/or the pull down info SEI message from the broadcast signal and output the parsed result to the Non-VCL Decoder.

The decoder L5020 may decode the input SI/PSI signaling information, 3:2 pulled-down 60i video stream, the picture timing SEI message and/or the pull down info SEI message.

The VCL (Video Coding Layer) Decoder L5030 may decode the 3:2 pulled-down 60i video stream.

The Non-VCL Decoder L5040 may decode the input picture timing SEI message and/or the pull down info SEI message.

The removing duplicated field processor L5050 may delete a field duplicated in the corresponding pull-down sequence by using the duplicate_flag element included in the picture timing SEI message and/or the pull down info SEI message.

The swapping adjacent field processor L5060 may reverse the order of two adjacent pictures by using the pairing_mismatch_flag element included in the pull down info SEI message and/or the pic_struct element included in the picture timing SEI message.

The interleaving parity fields processor L5070 may restore (a pair of) two fields constituting one frame in one sequence, in which the duplicated field is deleted and the order of two adjacent pictures is normally aligned, to one frame by interleaving. The video output from this processor may correspond to a progressive type video having 24 frames per second (24p) of 24 Hz.

When the transmitter generates 60i video by 3:2 pulling down a video shot by 24p and transmits the generated 60i video, the device for receiving a broadcast signal according to one embodiment of the present invention may receive the 3:2 pulled-down 60i video and restore the received video to the original video.

The reception device according to one embodiment of the present invention may receive a first NAL unit that includes an access unit delimiter NAL (Network Abstraction Layer) unit, and may receive NAL units in the order of a VPS (Video Parameter Sets) NAL unit, SPS (Sequence Parameter Sets) NAL unit, a PPS (Picture Parameter Sets) NAL unit, and a prefix SEI NAL unit (NAL unit of which nal_unit_type is 39).

The reception device according to one embodiment of the present invention may receive a picture timing SEI message of which payloadType of the prefix SEI NAL unit is 1, and may identify whether the current picture is an interlaced type or a progressive type through the source_scan_type element included in the picture timing SEI message when the frame_field_info_present_flag element included in the picture timing SEI message has a value of 1. Moreover, the reception device may identify whether the current picture is a top field, bottom field, or frame, a next or previous field is top field or bottom field and/or how its order is configured, through the pic_struct element included in the picture timing SEI message. Furthermore, the reception device may identify information as to whether the corresponding field is the same as the previous field, through the duplicate_flag element included in the picture timing SEI message, and may delete the repeated picture through the removing duplicated field processor.

For example, a picture having source_scan_type=0, pic_struct=9-12, and duplicate_flag=1 is deleted by the removing duplicated field processor, and the deleted field is not output to next processor. For another example, a picture having source_scan_type=0, pic_struct=9-12, and duplicate_flag !=1 is not deleted by the removing duplicated field processor and may be output to next processor as it is.

The reception device according to one embodiment of the present invention may additionally receive a pull down info SEI message of a user_data_registered_itu_t_t35 SEI message of which payloadType is 4, from the prefix SEI NALU (or, suffix SEI NALU of which nal_unit_type is 40) in addition the picture timing SEI message. As a result, the reception device may identify a cadence structure, and may restore 3:2 pulled-down interlaced video stream to the original progressive video prior to encoding at the transmitter.

The reception device according to one embodiment of the present invention may identify a start field and/or size of the corresponding cadence through the start_flag_of_cadence element and/or the size_of_cadence element included in the pull down info SEI message. In this case, the cadence may indicate one sequence set pulled-down by the same pattern. Moreover, the reception device may identify a pull-down type of the video stream reconfigured and received through the pull_down_type element included in the pull down info SEI message. That is, the reception device may identify a frame rate (fps) of the original video and a frame rate of the received video through the pull_down_type element. According to another embodiment of the present invention, instead of the pull_down_type element, the frame rate of the original video and the frame rate of the pulled-down video may be signaled. Moreover, the reception device may identify how many fields have been repeated using the pull_down_type element, the start_flag_of_cadence element and/or the size_of_cadence element included in the pull down info SEI message and/or which field(s) has(have) been repeated to be deleted, and may identify whether how many fields are mismatched and/or which field(s) is(are) mismatched.

The removing duplicated field processor may delete the picture of which duplicate_flag element value within the corresponding cadence is 1, and may output only the other pictures to the next processor.

When the current picture is pairing_mismatch_flag=1, on the basis of a value of the pic_struct element included in the picture timing SEI message, the swapping adjacent field processor may recombine the fields by disconnecting the existing pairing of the current picture (field) and newly pairing a field opposite to the field paired based on the current picture with the current picture, and may display the recombined fields.

For example, if the value of the pic_struct element of the picture timing SEI message is from 9 to 12, the reception device according to one embodiment of the present invention may additionally receive the pull down info SEI message. In case of start_flag_of_cadence=1, size_of_cadence_field=10, pull_down_type=3:2 pull-down type the reception device may identify that 2 of 10 consecutive fields should be disregarded and 4 frames should be configured through 8 fields. The reception device may determine a field to be deleted in case of duplicate_flag=1 of the corresponding field, and may delete the corresponding field. The reception device may output the corresponding field to next processor in case of duplicate_flag=0 of the corresponding field. In case of paring_mismatch_flag=1, the reception device may disconnect the existing pairing of the current picture (field) on the basis of the value of the pic_struct element included in the picture timing SEI message and newly pairing a field opposite to the field paired based on the current picture with the current picture. For example, in case of pic_struct=9 (top field paired with previous bottom field in output order), the reception device may pair the current field with a bottom field next to the current field. In case of pic_struct=10 (top field paired with previous top field in output order), the reception device may pair the current field with a top field next to the current field. In case of pic_struct=11 (top field paired with next bottom field in output order), the reception device may pair the current field with a bottom field prior the current field. In case of pic_struct=10 (top field paired with next top field in output order), the reception device may pair the current field with a top field prior to the current field.

Figure 6:
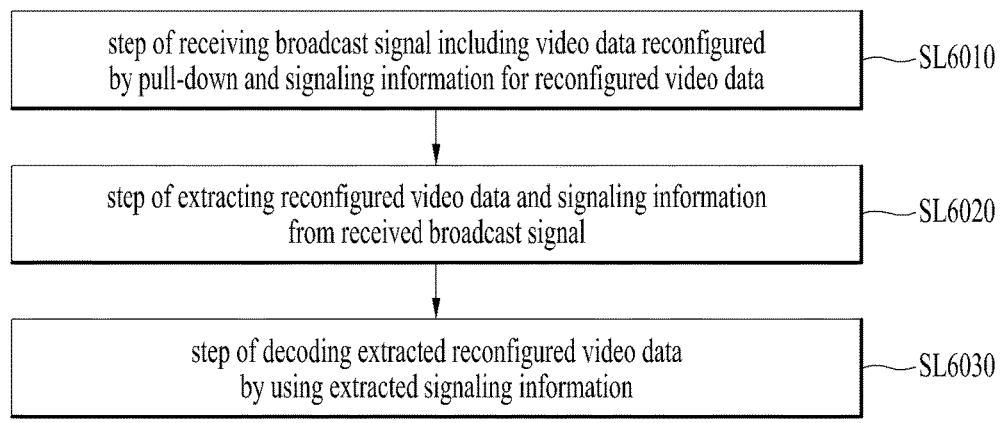
FIG. 6 is a diagram illustrating a method for receiving a broadcast signal in accordance with one embodiment of the present invention.

FIG. 6 is a diagram illustrating a method for receiving a broadcast signal in accordance with one embodiment of the present invention.

The method for receiving a broadcast signal according to one embodiment of the present invention may comprise the step SL6010 of receiving a broadcast signal including video data reconfigured by pull-down and signaling information for the reconfigured video data, the step SL6020 of extracting the reconfigured video data and the signaling information from the received broadcast signal and/or the step SL6030 of decoding the extracted reconfigured video data by using the extracted signaling information. Its detailed description has been made with reference to FIG. 6.

According to another embodiment of the present invention, the signaling information may include at least one of picture timing information for signaling a configuration of the reconfigured video data and pull down information for signaling information on pull-down applied to the reconfigured video data. In this case, the picture timing information may indicate information included in the picture timing SEI message. The pull down information may indicate information included in the pull down info SEI message. Details of the pull down information have been described with reference to FIGS. 3 and 4.

According to another embodiment of the present invention, the picture timing information may include at least one of source scan type information indicating a scan type of a picture, picture configuration information indicating configuration information of the picture, and duplicate flag information indicating duplication or not of the picture. In this case, the source scan type information may indicate information indicated by the source_scan_type element, the picture configuration information may indicate information indicated by the pic_struct element, and the duplicate flag information may indicate information indicated by the duplicate_flag element. Details of the above information has been described with reference to FIGS. 4 and 5.

According to another embodiment of the present invention, the pull down information may include at least one of pull down type information indicating a pull-down type to the reconfigured video data, cadence size information indicating a size of a cadence indicating a set of pictures to which the same type of pull-down is applied, cadence start information indicating a first picture of the cadence, paring mismatch information indicating whether pairing of a picture is matched with pairing before the video data is reconfigured, and duplicate flag information indicating duplication or not of the picture. In this case, the pull down type information may indicate information indicated by the pull_down_type element, the cadence size information may indicate information indicated by the size_of_cadence element, the cadence start information may indicate information indicated by the start_of_cadence_flag element, and the pairing mismatch information may indicate information indicated by the pairing_mismatch_flag element. Details of the above information has been described with reference to FIG. 3.

According to another embodiment of the present invention, the picture timing information and the pull down information may be transmitted by being included in the supplemental enhancement information (SEI) message. Details of these kinds of information has been with reference to FIGS. 3 and 4.

According to another embodiment of the present invention, the restoring step may include the step of deleting the duplicated picture from the reconfigured video data by using at least one of the duplicate flag information included in the picture timing information and the duplicate flag information included in the pull down information, the step of controlling pairing of the pictures included in the video data from which the duplicated picture is deleted, by using the picture configuration information and the pairing mismatch information and realigning the order of the pictures, and/or the step of restoring the paired pictures included in the realigned video data to one frame. The details of the restoring step has been described with reference to FIG. 5.

According to another embodiment of the present invention, at least one of the step of deleting the duplicated picture and the step of realigning the order of the pictures may be performed prior to the decoding step. This detailed description has been made with reference to FIG. 5.

Figure 7:
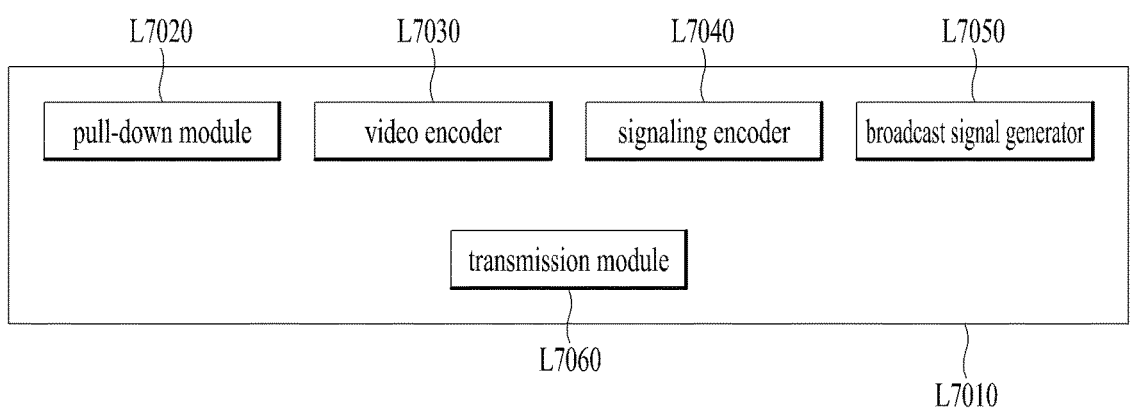
FIG. 7 is a diagram illustrating a configuration of a device for transmitting a broadcast signal in accordance with one embodiment of the present invention.

FIG. 7 is a diagram illustrating a configuration of a device for transmitting a broadcast signal in accordance with one embodiment of the present invention.

The device L7010 for transmitting a broadcast signal according to one embodiment of the present invention may comprise a pull-down module L7020 for pulling down and reconfiguring video data, a video encoder L7030 for encoding the reconfigured video data, a signaling encoder L7040 for encoding signaling information for the reconfigured video data, a broadcast signal generator L7050 for generating a broadcast signal including the encoded video data and the encoded signaling information, and/or a transmission module L7060 for transmitting the generated broadcast signal. The detailed description of functions performed by the respective modules has been described with reference to the drawing illustrating the method for transmitting a broadcast signal according to one embodiment of the present invention.

Figure 8:
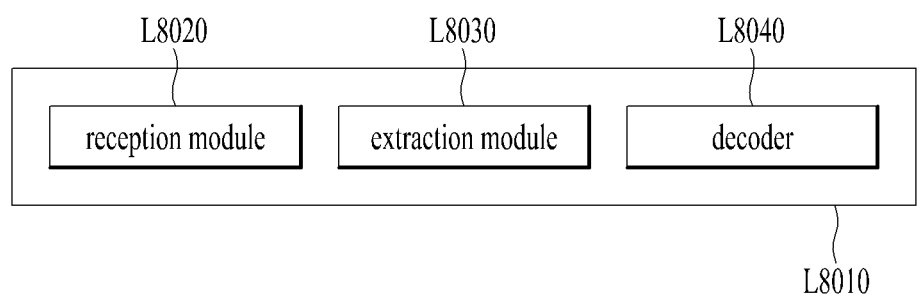
FIG. 8 is a diagram illustrating a configuration of a device for receiving a broadcast signal in accordance with one embodiment of the present invention.

FIG. 8 is a diagram illustrating a configuration of a device for receiving a broadcast signal in accordance with one embodiment of the present invention.

The device L8010 for receiving a broadcast signal according to one embodiment of the present invention may comprise a reception module L8020 for receiving a broadcast signal including video data reconfigured by pull-down and signaling information for the reconfigured video data, an extraction module L8030 for extracting the reconfigured video data and the signaling information from the received broadcast signal, and/or a decoder L8040 for decoding the extracted reconfigured video data by using the extracted signaling information. The detailed description of functions performed by the respective modules has been described with reference to the drawing illustrating the method for receiving a broadcast signal according to one embodiment of the present invention. In this case, the reception module and/or the extraction module may indicate the aforementioned demultiplexer. The decoder may indicate the aforementioned video decoder.

The modules, units or blocks according to the embodiments of the present invention may be processors/hardware that execute consecutive steps stored in a memory (or storage unit). Each step or methods disclosed in the aforementioned embodiments may be performed by hardware/processors. Also, the methods suggested in the present invention may be executed as a code. This code may be written in a storage medium that may be read by the processor and therefore may be read by the processor provided by the apparatus according to the embodiments of the present invention.

For convenience of description, although the description has been made for each of the drawings, the embodiments of the respective drawings may be incorporated to achieve a new embodiment. A computer readable recording medium where a program for implementing the aforementioned embodiments is recorded may be designed in accordance with the need of the person skilled in the art within the scope of the present specification.

The device and method according to the present invention are not limited to the aforementioned embodiments, and all or some of the aforementioned embodiments may selectively be configured in combination so that various modifications may be made in the aforementioned embodiments.

Meanwhile, the video processing method of the present invention may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

Mode for Implementing the Invention

Various embodiments have been described in the best mode for implementing the invention.

INDUSTRIAL APPLICABILITY

The present invention is used in the field of providing a series of broadcast signals.

It will be apparent to those skilled in the art that the present specification can be embodied in other specific forms without departing from the spirit and essential characteristics of the specification. Thus, the scope of the specification should be determined by reasonable interpretation of the appended claims and all change which comes within the equivalent scope of the specification are included in the scope of the specification.

The invention claimed is:

1. A method for transmitting a broadcast signal, the method comprising:
    reconfiguring video data by performing a pull-down process in order to achieve a higher frame rate than an original frame rate;
    encoding the reconfigured video data and signaling information including a picture timing supplemental enhancement information (SEI) message for the reconfigured video data to generate a video stream and pull down information for the pull-down process applied to the reconfigured video data,
    the picture timing SEI message including picture configuration information indicating whether a picture of the reconfigured video data is displayed as a frame or one or more fields, scan type information indicating a scan type of the picture of the reconfigured video data, and duplicate flag information indicating that the picture of the reconfigured video data is indicated to be a duplicate of a previous picture of the reconfigured video data as a result of the pull-down process, and
    the pull down information including pull down type information representing a type of the pull-down process, cadence size information representing a size of pictures to which a same type of the pull-down process is applied, and cadence start information representing a start picture of the pictures;
    generating a broadcast signal including the generated video stream and the signaling information; and
    transmitting the generated broadcast signal.

2. The method according to claim 1, wherein the pull down information further includes paring mismatch information indicating whether pairing of a picture is matched with pairing before the video data is reconfigured, and duplicate flag information indicating duplication or not of the picture.

3. The method according to claim 1, wherein the pull down information is transmitted by being included in the SEI message.

4. A method for receiving a broadcast signal, the method comprising:
    receiving a broadcast signal including a video stream, the video stream including reconfigured video data by a pull-down process in order to achieve a higher frame rate than an original frame rate, and signaling information including a picture timing supplemental enhancement information (SEI) message for the reconfigured video data and pull down information for the pull-down process applied to the reconfigured video data, the picture timing SEI message including picture configuration information indicating whether a picture of the reconfigured video data is displayed as a frame or one or more fields, scan type information indicating a scan type of the picture of the reconfigured video data, and duplicate flag information indicating that the picture of the reconfigured video data is indicated to be a duplicate of a previous picture of the reconfigured video data as a result of the pull-down process, and the pull down information including pull down type information representing a type of the pull-down process, cadence size information representing a size of pictures to which a same type of the pull-down process is applied, and cadence start information representing a start picture of the pictures;

extracting the reconfigured video data and the signaling information from the video stream; and decoding the extracted reconfigured video data by using the extracted picture timing SEI message.

5. The method according to claim 4, wherein the pull down information further includes paring mismatch information indicating whether pairing of a picture is matched with pairing before the video data is reconfigured, and duplicate flag information indicating duplication or not of the picture.

6. The method according to claim 4, wherein the pull down information is transmitted by being included in the SEI message.

7. The method according to claim 5, further comprising restoring the decoded reconfigured video data to video data prior to pulling-down by using the picture timing SEI message.

8. The method according to claim 7, wherein the restoring includes:
deleting a duplicated picture from the reconfigured video data by using at least one of the duplicate flag information included in the picture timing SEI message and the duplicate flag information included in the pull down information;
controlling pairing of the pictures included in the video data from which the duplicated picture is deleted, by using the picture configuration information and the pairing mismatch information and realigning the order of the pictures; and
restoring the paired pictures included in the realigned video data to one frame.

9. The method according to claim 8, wherein at least one of the deleting the duplicated picture and the realigning the order of the pictures is performed prior to the decoding step.

10. A device for transmitting a broadcast signal, the device comprising:
a pull-down module for reconfiguring video data by performing a pull-down process in order to achieve a higher frame rate than an original frame rate;
a video encoder for encoding the reconfigured video data and signaling information including a picture timing supplemental enhancement information (SEI) message for the reconfigured video data to generate a video stream and pull down information for the pull-down process applied to the reconfigured video data, the picture timing SEI message including picture configuration information indicating whether a picture of the reconfigured video data is displayed as a frame or one or more fields, scan type information indicating a scan type of the picture of the reconfigured video data, and duplicate flag information indicating that the picture of the reconfigured video data is indicated to be a duplicate of a previous picture of the reconfigured video data as a result of the pull-down process, and the pull down information including pull down type information representing a type of the pull-down process, cadence size information representing a size of pictures to which a same type of the pull-down process is applied, and cadence start information representing a start picture of the pictures;

a broadcast signal generator for generating a broadcast signal including the generated video stream and the signaling information; and a transmission module for transmitting the generated broadcast signal.

11. A device for receiving a broadcast signal, the device comprising:
a reception module for receiving a broadcast signal including a video stream, the video stream including reconfigured video data by a pull-down process in order to achieve a higher frame rate than an original frame rate, and signaling information including a picture timing supplemental enhancement information (SEI) message for the reconfigured video data and pull down information for the pull-down process applied to the reconfigured video data, the picture timing SEI message including picture configuration information indicating whether a picture of the reconfigured video data is displayed as a frame or one or more fields, scan type information indicating a scan type of the picture of the reconfigured video data, and duplicate flag information indicating that the picture of the reconfigured video data is indicated to be a duplicate of a previous picture of the reconfigured video data as a result of the pull-down process, and the pull down information including pull down type information representing a type of the pull-down process, cadence size information representing a size of pictures to which a same type of the pull-down process is applied, and cadence start information representing a start picture of the pictures;

an extraction module for extracting the reconfigured video data and the signaling information from the video stream; and a decoder for decoding the extracted reconfigured video data by using the extracted picture timing SEI message.

* * * * *